United States Patent [19]

Rösch

[11] Patent Number: 4,667,577
[45] Date of Patent: May 26, 1987

[54] PISTONS FOR COMBUSTION ENGINES AND/OR FOR COMPRESSORS AND CONNECTING RODS THEREFOR

[75] Inventor: Fritz Rösch, Schwabach, Fed. Rep. of Germany

[73] Assignee: Alcan Aluminiumwerk Nürnberg GmbH, Nuremberg, Fed. Rep. of Germany

[21] Appl. No.: 673,116

[22] Filed: Nov. 19, 1984

[30] Foreign Application Priority Data

Nov. 24, 1983 [DE] Fed. Rep. of Germany ....... 3342528

[51] Int. Cl.$^4$ ............................................. F16J 1/16
[52] U.S. Cl. .................................. 92/187; 403/146; 403/150
[58] Field of Search ............... 403/124, 150, 151, 152, 403/145, 146, 158, 159, 160, 161, 162; 92/187, 188, 238; 74/579; 123/193 P; 384/125, 215, 216

[56] References Cited

U.S. PATENT DOCUMENTS

| | | | |
|---|---|---|---|
| 1,524,702 | 2/1925 | Fleischer | 403/150 |
| 1,542,209 | 6/1925 | Bergeron | 403/151 |
| 1,558,444 | 10/1925 | Joseph | 403/146 |
| 2,877,069 | 3/1959 | Dispenza | 403/124 |
| 3,402,643 | 9/1968 | Maat | 92/187 |
| 4,430,928 | 2/1984 | Magnarelli et al. | 92/187 |

Primary Examiner—William A. Cuchlinski, Jr.
Attorney, Agent, or Firm—Cooper, Dunham, Griffin & Moran

[57] ABSTRACT

A piston for combustion engines has connecting rod mounting apertures or pin bosses for receiving a gudgeon pin for a connecting rod, which bosses have resilient regions in the form of annular resilient sectors (17, 16) by the formation of slots in the axial direction of the piston. These annular spring sectors can however also be provided on the little end. Upon the occurrence of disturbing oscillations coming from the region of the crank shaft, these are transmitted axially of the resilient annular sectors and suppressed.

7 Claims, 4 Drawing Figures

PISTONS FOR COMBUSTION ENGINES AND/OR FOR COMPRESSORS AND CONNECTING RODS THEREFOR

The invention relates to pistons for combustion engines and/or for compressors and to connecting rods therefor, the connecting rod, which is connected by a pin mounted in pin bosses, being constrained in the piston against movement axially of the gudgeon pin in such manner that the connecting rod head (little end) and the pin bosses are in engagement via front sliding surfaces which extend only over a part of the pin periphery or the pin boss periphery.

In a first type of arrangement of piston and connecting rod, the connecting rod, pivoted on the piston by means of a gudgeon pin, is laterally constrained by the crank shaft. For this purpose, so-called bearing collars for the connecting rod guidance are provided on the crank shaft.

Such a piston is known from DE-AS-28 28 402. In this connection, bores are provided for receiving the gudgeon pin, which serve to receive cylindrical sleeves. These reception sleeves are provided on the gudgeon pin in a floating manner.

Between the connecting rod sitting on the gudgeon pin and the front end of the sleeves facing towards this, spring elements, operating in the axial direction of the gudgeon pin, particularly coil springs, are provided. These coil springs serve to distance the floating sleeves from the respective opposed front side of the connecting rod.

From U.S. Pat. No. 2,877,069, a connecting rod is known which is also guided on the crank shaft and which is connected to the piston by means of a gudgeon pin consisting of two parts. Each part of the gudgeon pin is arranged on a different side of the connecting rod in the piston. The ends of the two gudgeon pin parts facing towards the connecting rod have respective mushroom-shaped heads which engage in correspondingly formed apertures in the little end. Pressure springs engage on both gudgeon pin parts. These springs serve automatically to press the heads of the pin parts onto to the contact surfaces of the little end in the event of wear.

In the above-mentioned known pistons, as a result of the large play of the connecting rod in the axial direction of the gudgeon pin, it is necessary that the connecting rod is laterally constrained on the crank shaft by means of a bearing collar. If one now wants to constrain the connecting rod laterally not on the crank shaft but in the piston itself, the bearing collar on the crank shaft can be omitted, whereby this becomes lighter. This however results in the disadvantage that the bending and torsional oscillations of the lighter crank shaft become larger and can be transferred via the connecting rod to the piston. The known coil springs are not suitable for constraining the connecting rod as a result of the large play of the little end. The large spring play does not provide sufficient guiding security for the connecting rod. Connecting rods guided in the piston must have only a small amount of play in the axial direction of the gudgeon pin.

From GB-PS No. 851 322, in claim 1 thereof, a second type of arrangement is known in which the connecting rod is laterally guided in the piston and in fact in the practical case only in the upper region of the pin bosses. Such guidance of the connecting rod only in a partial region of the bounding inner surface of the pin bosses has the advantage that inexactitudes in the parallelism of the boss inner surfaces in guidance of the connecting rod are made less strongly noticeable than in the case in which the entire peripheral surfaces of the pin bosses engage on the connecting rod. Such pistons have however the disadvantage that bending and torsional oscillations of the crank shaft can be directly transferred to the piston. Such bending and torsional oscillations are partaicularly disadvantageous in respect of their components in the direction of the pin axis. Owing to the guidance of the connecting rod in the piston, such conditions, which moreover are associated with impact noises, cannot be avoided. Comparable piston arrangements are also known from U.S. Pat. No. 3,402,643 and DE-PS No. 32 11 472.

Finally, DE-PS No. 368 705 relates to a piston belonging to the second type of arrangement in which the little end either engages directly on the front surfaces of the pin bosses or indirectly via two laminar spacers. With the laminar spacers, a small self elasticity is provided although these serve expressly for securing of the gudgeon pin and thereby the little end connected to this in a rotationally and displaceably stiff manner, so that according to their purpose they are to be regarded as rigid.

It is therefore an object of the invention, proceeding from a piston of the type mentioned in the introduction, to permit substantial elimination of the transmission of such bending and torsional oscillations of the crank shaft to the piston, in particular the components of movement impacting in the axial direction of the pin so that in addition the noises which are associated with these no longer appear.

The object is achieved according to the invention by the features given in claim 1.

In advantageous manner, the bending and torsional oscillations stemming from the crank shaft are suppressed as a result of the effective elastic contact. The connecting rod is however guided as before solely in the piston, that is to say by the stop surfaces which limit the maximum allowable play of the connecting rod in the piston.

According to an advantageous embodiment, at least the bearing surface on one side of the little end is inclined towards the respective neighboring bearing surface and flat, and the pin boss and/or the little end is provided in the region of this bearing surface for the formation of at least one annular sector which is resilient substantially in the direction of the pin axis with at least one slot, whose sector surface is smaller than the bearing surface. This means that—referred to the pin axis—the sector angle formed by the slot is smaller than the maximum possible contact sector angle of the bearing surface of the pin boss or of the little end.

From this advantage results that by the slot formation in dependence upon its more or less large depth viewed in the direction of the pin axis a detached annular region on the pin boss or on the little end results which is elastically movable in the direction of the pin axis. This resilient annular sector integrated with the pin boss acts so to speak as a damping element. In addition, this annular sector serves for guidance of the little end so that guidance of the connecting rod on the crank shaft is not necessary. As a result of the incline of the two opposed bearing surfaces of the pin boss and the little end, there results a partial contact region for the respective resilient annular sector which is displaced during impacts in the axial direction of the pin, so that with increasing bending the resilient annular sector of the contact region enlarges and the spring effect is increased.

Advantageously, the slot and the bearing surface are mutually inclined, whereby as a result of the changing thickness of the resilient annular sector, likewise the spring effect can be set in the desired manner. The slot and bearing surface can however also run parallel to one another.

According to an advantageous embodiment, the bearing surface of the little end or the pin boss has a predetermined bent inclined path with reference to the respective oppositely lying bearing surface, in order to achieve a predetermined spring characteristic.

As a result of the choice of the bending, a type of control curve results with the effect that with increasing elastic deformation of the resilient spring sector in the direction of the pin axis in dependence upon the displacement in the axial direction, a more or less rapid increase of the contact surfaces between the two neighboring bearing surfaces results. By this means, the spring effect is adjusted in a desired manner to achieve a predetermined characteristic.

Advantageously, the maximum contact sector angle is a reflex angle. The form and the arrangement of the respective bearing surfaces can however also be executed according to the state of the art mentioned in the introduction.

In the following, the invention will be described on the basis of two exemplary embodiments illustrated in FIGS. 1 and 2, in which.

Figure 1:
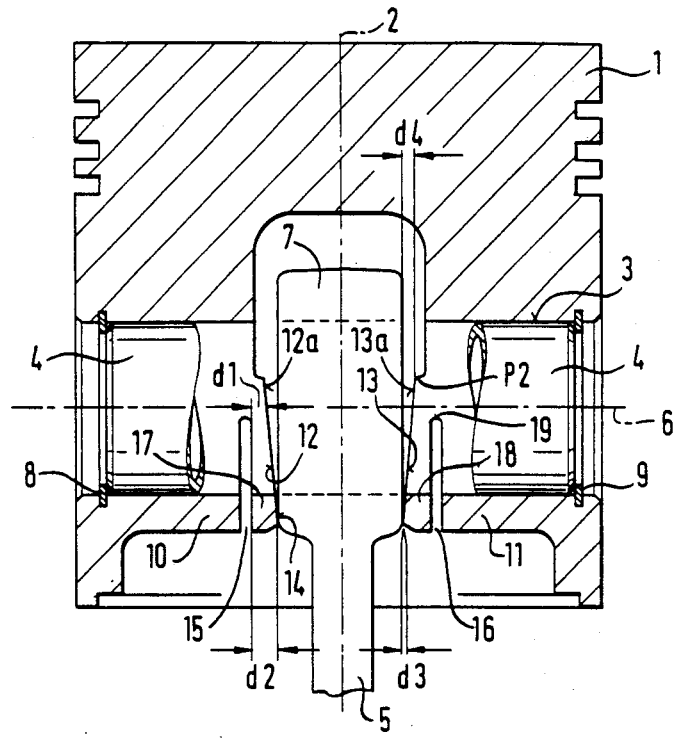
FIG. 1 shows a first exemplary embodiment with a resilient slotted annular sector on both pin boss sides.
Figure 2:
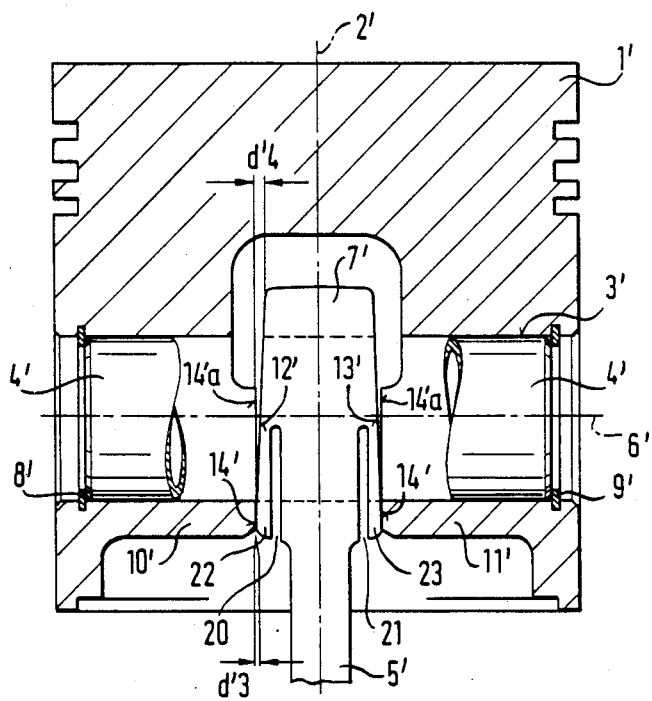
FIG. 2 shows a second exemplary embodiment with respective resilient annular sectors on both sides of the little end.

According to FIG. 1, a piston is designated with 1 in which at right angles to the piston axis 2 a throughgoing bore 3 is provided which serves for receiving a pin 4 by which a connecting rod 5 is pivoted on the piston 1. The central axis of the gudgeon pin 4 is designated with 6. The gudgeon pin 4 is represented in FIGS. 1 and 2 in the region of the little end 7 in a cut-away form for improved clarity.

The gudgeon pin 4 is secured axially by respective Seeger rings 8 and 9. The part of the piston provided with the bore 3 forms a so-called pin boss 10 or 11 on each side of the little end 7. Each pin boss forms on the side facing the little end 7 a bearing surface 12 or 13 which is inclined at an acute angle to the neighboring front side of the little end 7. In this manner, a sliding or bearing surface region 14 results also on the side of the little end.

Slotted sectors are designated with 15 and 16 which have a predetermined width and a predetermined depth as seen in the actual direction of the piston 1, but which do not however reach to the center line 6 of the piston.

As a result, the slots 15 and 16 form on respective pin bosses 10 and 11 respective annular sectors 17 and 18 which include a sectorial angle (referred to the axis 6) of less than 180°. As a result of the elastic formation of the material of the pin boss 10 or 11 and by means of the slots 15 and 16, a self elastic and thereby resilient annular sector 17 or 18 results constructively from a smallest breadth d1 in the region 6 near the axis and a largest breadth d2 in the contact region of the sliding or bearing surface 14.

The axial play of the little end relative to the pin boss is designated with d3, and this can be zero or even negative if the connecting rod is installed with a certain pre-stress against the resilient surfaces. d4 is the maximum open width or the maximum possible play of the little end with respect to the bearing surface 12 or 13 of the pin boss 10 or 11 in a direction having regard to the maximum possible spring displacement of the resilient annular sector 17 or 18. This maximum possible play d4 is of course larger than the undamped static initial play d3. It is determined by the stop surfaces 12a, 13a of the unslotted region of the front surface of the respective pin boss.

The elastic movement of the little end 7 which is possible in the axial direction of the pin is limited by the contact of the bearing surface 13 or 14 with the neighboring front side of the little end in the no longer slotted region of the bearing surfaces. This limitation of the resilient path by the contact of the bearing surfaces with the respective front bearing surface of the little end in the no longer slotted region prevents on the one hand an undesired large play of the connecting rod in the axial direction of the gudgeon pin and on the other hand also mechanical overstressing of the resilient material at the base of the slot.

The largest possible play d4 is referred in FIG. 1 to the end of the inclined bearing surface 12 or 13 and not to the point of the bearing surface which is aligned with the respective base 19 of the slot 16 or 15. The reason for this consists inter alia in that on the basis of the play of the connecting rod 5 which is present in the direction of the piston axis 2 not only displacement of the little end 7 in the direction of the pin axis 6 but simultaneously displacement in the axial direction 2 is possible, which leads to a slight tilting or oscillating of the connecting rod 5 within the tolerances. In the present case, the upper end point P2 of the contact surface 12 or 13 of the pin aperture 10 or 11 is displaced upwardly above the axis 6 of the pin 4, which means that the annular bearing sector of the pin boss, formed with reference to the pin axis 6, is larger than the annular sector 17 or 18 of the pin boss 10 or 11 referred to the same pin axis 6.

If now bending or torsional oscillations appear in the region of the non-illustrated crank shaft, these are transmitted via the connecting rod, in particular via the little end 7, to the piston 1. In this way there results a more or less periodic transmission of the oscillations or impact forces on the annular sectors of the pin bosses, in which connection in the course of the increasing demands from these forces the respective annular sector is elastically displaced in the axial direction. As a result the oscillation forces are suppressed by the spring forces of the two annular sectors 17 and 18 acting in the opposite direction. The geometrical dimensions of the two annular sectors form the spring properties in combination with the elastic modulus of the material. By suitable construction of the contact surface or contact inclination 12 or 13 having regard to the form and angle, the spring properties can be suitably selected in the course of the displacmeent of each resilient annular sector in order that upon the appearance of any periodic force components first of all a slightly smaller spring force is given which then correspondingly increases in the course of the elastic displacement.

In the exemplary embodiment according to FIG. 2, the parts corresponding to those in FIG. 1 are provided with the same reference numerals. They are however provided with indices for differentiation purposes.

In contrast to the exemplary embodiment according to FIG. 1, in the second exemplary embodiment the slots 20 and 21 provided for elastic spring formation are provided on the little end 7'. The corresponding stop surfaces on the little end are designated with 12' and 13', and the counter surface on the pin bosses with 14'a. Referred to the pin axis 6', the resilient annular sector 22 or 23 includes an angular region which is smaller than 180°. The thickness of each resilient annular sector is so selected that on the one hand the disturbing periodic forces can be suppressed and on the other hand as a result no disturbing material loading of the respective annular sector results. Furthermore, these annular sectors are so arranged that they suppress periodic shocks above a certain force level.

Figure 3:
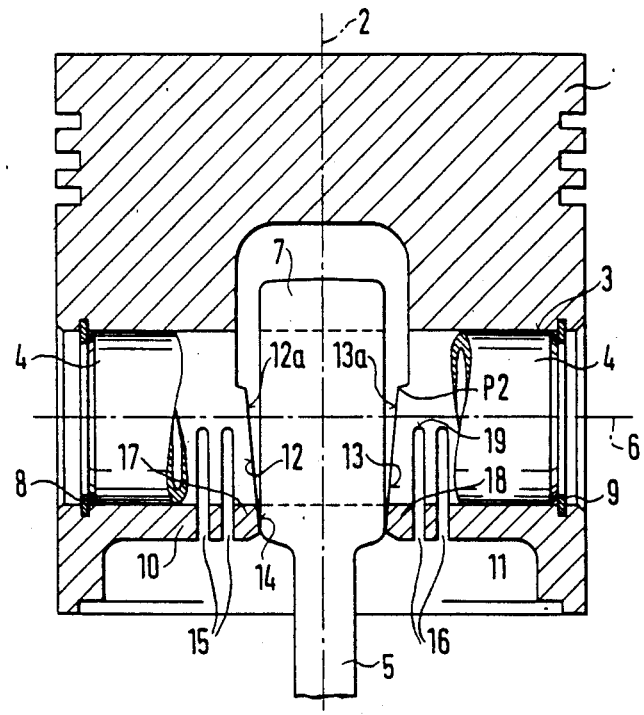
FIG. 3 shows a third exemplary embodiment, similar to FIG. 1 but having a plurality of slots on each pin boss.
Figure 4:
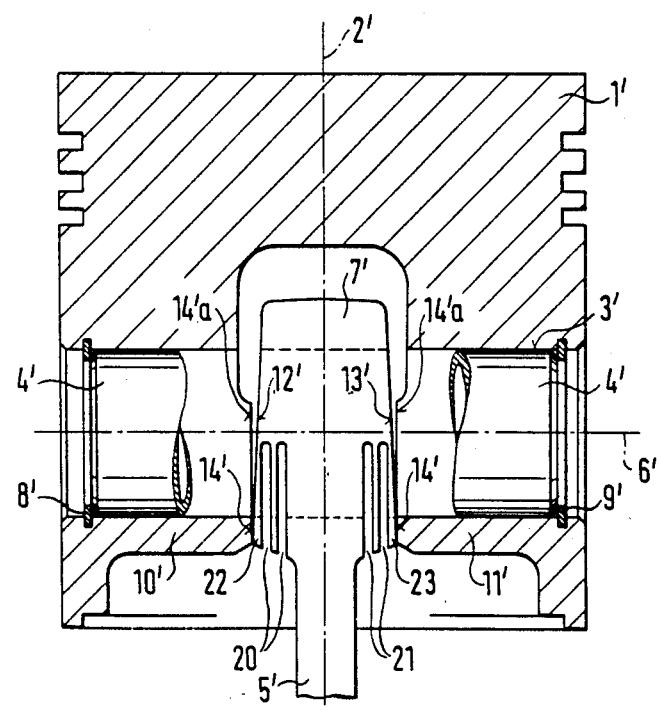
FIG. 4 shows a fourth exemplary embodiment with a plurality of slots on each front region of the little end.

According to further exemplary embodiments respectively illustrated in FIGS. 3 and 4, a plurality of slots can be provided behind one another for example on both sides of the little end 7 in the pin bosses 10 or 11 (FIG. 3), or on each front region of the little end (FIG. 4) in order in this manner to achieve a combined spring effect in such manner that after closure of the first annular sector channel the second annular sector comes into effect (with simultaneous increase of the spring force effect).

I claim:

1. Piston for combustion engines and/or for compressors or connecting rods therefor, the connecting rod being connected by a pin mounted in pin bosses and being constrained in the piston against movement axially of the gudgeon pin in such manner that the little end and the pin bosses are in contact by means of front sliding surfaces extending only over a part of the pin periphery or the pin boss periphery, characterised in that the sliding bearing surfaces (12, 13, 12', 13'; 14, 14') of the pin bosses (10, 11, 10', 11') or the little end (7, 7') are constructed to be self elastic in the pin axial direction (6, 6'), and in that stop surfaces (12a, 13a; 14'a) are adjacent in the peripheral direction to the sliding bearing surfaces (12, 13; 12', 13', 14, 14') and limit the spring displacement of the sliding bearing surfaces (12, 13, 12', 13', 14, 14') to the maximum allowable play (d4, d4') for guidance of the connecting rod in the piston.

2. Piston according to claim 1 characterised in that at least the bearing surface (12, 13) of one of the pin bosses (10 or 11) and/or at least the bearing surface (14') on one side of the little end (7') is inclined with respect to the respectively adjacent bearing surface and is flat and in that the pin boss (10, 11) and/or the little end (7') is provided with at least one slot (15, 16; 20, 21) for the formation of at least one annular sector (17, 18; 22, 23) resilient substantially in the direction of the pin axis (6, 6'), the sectorial surface of which slot is smaller than that of the bearing surface.

3. Piston according to claim 2 characterised in that the slot and the bearing surface are mutually inclined at an acute angle.

4. Piston according to claim 1 characterised in that the bearing surfaces of the little end or of the pin boss have a predetermined curved inclination referred to the respective oppositely lying bearing surface in order to achieve a predetermined spring characteristic.

5. Piston according to claim 1 characterised in that the maximum contact sector angle of the bearing surface (12, 13; 12', 13') is larger than 180°.

6. Piston according to claim 1 characterised in that the annular spring sectors on both sides of the little end and/or on the pin bosses have differing spring characteristics.

7. Piston according to claim 1 characterised in that on each pin boss or on each front region of the little end a plurality of mutually adjacent slots are arranged.

* * * * *